H. E. STARRETT.

Fastenings for Overshoes.

No. 4.748. Reissued Feb. 6, 1872.

Witnesses:

G. Heathrys.

John N. Lemon

Inventor:

Mrs. Helen E. Starrett

Per Munn & Co

Attorneys.

UNITED STATES PATENT OFFICE.

HELEN EKIN STARRETT, OF LAWRENCE, KANSAS.

IMPROVEMENT IN FASTENINGS FOR OVERSHOES.

Specification forming part of Letters Patent No. 100,207, dated February 22, 1870; reissue No. 4,748, dated February 6, 1872.

*To all whom it may concern:*

Be it known that I, HELEN EKIN STARRETT, of Lawrence, in the county of Douglass and State of Kansas, have invented a new and useful Improvement in Fastening for Rubber Shoes; and I do hereby declare the following to be a full, clear, and exact description of the same, reference being had to the accompanying drawing making a part of this specification, in which—

Figure 1:
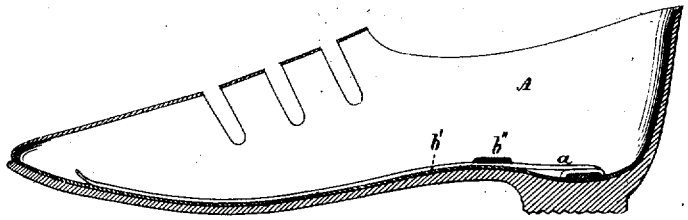
Figure 2:
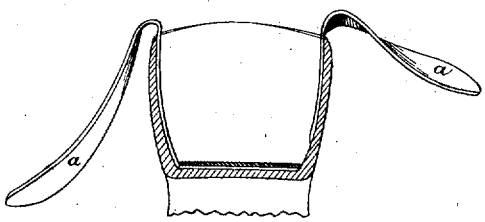

Figure 1 is a longitudinal vertical section, showing a loop fastened in the insole and a strap passed through the loop and also through an elastic cord; and Fig. 2 is a transverse vertical section, showing the strap glued to either side of the mouth of the shoe, and also the strap passed under the heel.

This invention consists in a strap or straps attached to the inside or mouth of an overshoe and intended to be fastened in any suitable manner over the top of the foot for the purpose of retaining the shoe thereupon.

In the drawing, A is the shoe; *b'*, the insole, which is glued to the bottom of the shoe; *b*, Fig. 1, a loop strongly secured in the insole before the latter is glued to the shoe; *a*, Fig. 1, the strap passed under the loop *b*, and when the shoe is in use, drawn up over the wearer's foot, the branches of the strap being fastened together by buckle, button, hook, loop, or the like. *b''*, Fig. 1, is an elastic band affixed transversely to the upper side of the insole for the purpose of retaining the strap when not in use. In Fig. 2, *a a* are two short straps glued at their ends, between the lining and the rubber of the shoe—one to either side of the mouth of the shoe—and intended to be fastened over the top of the foot in a manner similar to that above described. In Fig. 2 there is also another strap, *a*, passed at its middle part under the insole at the heel and intended to be fastened over the top of the foot like the rest. Instead of being passed under the heel, this latter strap may be passed under any other part of the insole or behind the counter.

Having thus described my invention, what I claim as new, and desire to secure by Letters Patent, is—

As a new article of manufacture, an India-rubber overshoe provided with a strap or straps, *a*, which are secured to the inside or mouth thereof, and vulcanized therewith, substantially as and for the purpose set forth.

HELEN EKIN STARRETT.

Witnesses:

PAUL R. BROOKS,

B. MCALLASTER.